Jan. 26, 1943.                    H. SCHARFF                    2,309,544
                        COMBINATION CASING AND MIRROR
                             Filed Aug. 24, 1942
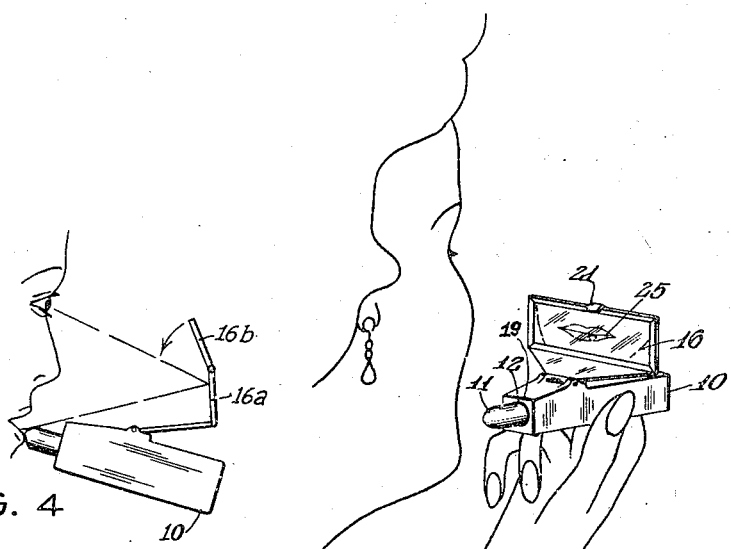
FIG. 1
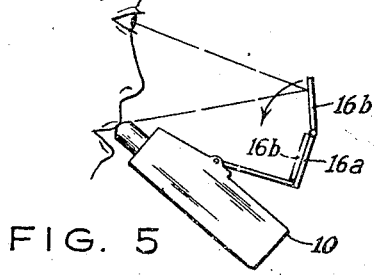
FIG. 4
FIG. 5
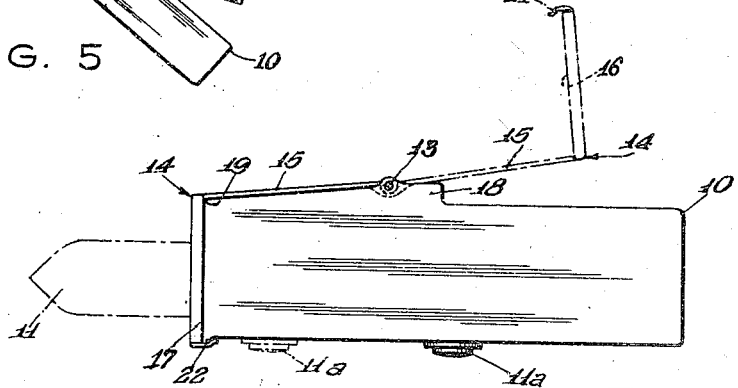
FIG. 2.
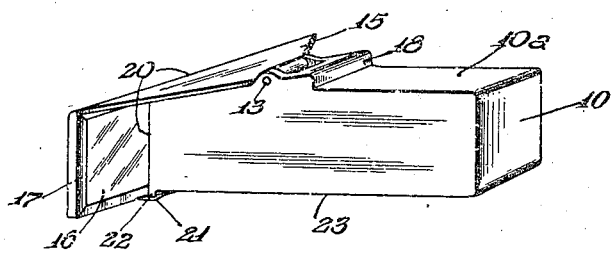
FIG. 3.
INVENTOR.
Henry Scharff
BY
Leon M. Strauss Patented Jan. 26, 1943

2,309,544

UNITED STATES PATENT OFFICE 2,309,544

COMBINATION CASING AND MIRROR

Henry Scharff, New York, N. Y.

Application August 24, 1942, Serial No. 455,917

4 Claims. (Cl. 132—79)

This invention relates to combination casing and mirror and more particularly to lipstick casing and mirror.

It is an object of the present invention to provide a lipstick casing or holder having attached thereto a mirror, whereby the movements of the lipstick when being applied to the lips of a person may be viewed in said mirror, the latter being made to follow the movements of said lipstick.

It is another object of the present invention to provide a casing having an opening for containing a lipstick therein, and a mirror movably attached to said casing and in such relation that the mirror when in operative position will be located at a level above and angularly with respect to said opening, so that the lipstick when projecting beyond the opening of said casing may be reflected in the mirror.

It is a further object of the present invention to provide a holder for a lipstick or the like and a mirror movably connected to said holder, whereby said mirror in its inoperative position constitutes a closure for said holder and when moved into operative position assumes an angle with relation to said holder so that the image of the lipstick may be observed in the mirror.

Yet, another object of the present invention is to provide means to releasably retain said mirror holder in its operative and inoperative positions.

Still another object of the present invention is to provide an elongated holder for a lipstick or the like in combination with mirror means hinged to the surface of said holder and extending crosswise to the longitudinal axis of said holder, whereby the lower lip and then the upper lip of a person may be viewed successively in said mirror means while the lipstick is being applied to said lips.

A still further object of the present invention resides in the provision of a preferably rectangular holder for a lipstick or the like from which the forward part of a lipstick or the like may protrude while the remainder thereof is being housed within the holder, and a mirror support hinged to the top of said lipstick holder adapted to be swung to a predetermined angular position on said top and with respect to the forward lipstick part in order to facilitate reflection of the latter in the mirror.

In general, this invention is applicable, besides to the herein mentioned lipstick and mirror combination, to different fields of industry and is capable of being developed and used for a variety of purposes, such as cigarette or cigar casing and match holder, medical or dental instrument and mirror or light source therefor or like combinations.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawing:

Fig. 1 illustrates an embodiment of the invention, shown in perspective view and in use by a person.

Fig. 2 is a side elevational view of the embodiment seen in Fig. 1.

Fig. 3 is a perspective view of the embodiment shown in Fig. 2 and viewed somewhat from the rear.

Figs. 4 and 5 are diagrammatic views of a lipstick with mirror means to illustrate different positions of the lipstick with respect to the lips of a person.

In a preferred embodiment of the invention shown in the drawing, there is indicated by numeral 10 a preferably elongated casing or base adapted to hold or house therein a lipstick 11, which, as it is conventional, may be moved by means of knob 11a and slot (not shown) to slide in said casing 10 through opening 12 into projected position (Fig. 1).

Casing 10 may be made of any desired material, such as metal, alloyed material, plastic substance and the like.

Pivotally attached or hinged, as at 13, to top 10a of casing 10 is a member 14 provided with a supporting leg 15 and mirror 16 located and secured in frame 17 and extending angularly from said leg 15. Hinge means 13 is preferably positioned at a predetermined distance on a raised portion or inclined plane 18 sloping downwardly toward the forward upper edge 19 of casing 10, as clearly seen in Figs. 2 and 3.

The length of leg 15 is such that when said leg 15 is moved about pivot or hinge means 13 to face and lie upon inclined portion 18, mirror 16 will assume a position (Figs. 2 and 3) whereby the center portion 20 thereof will cover and close opening 12 at the forward or front end of housing or casing 10. To facilitate a firm closing position, there is provided at mirror frame 17 a latch or projecting lug 21 which preferably springedly engages with a ledge 22 at bottom 23 of casing 10.

It is well understood that other locking means may be employed, such as spring latch means and the like and that hinge means 13 may be of the spring actuated type, as it is well known in the art.

Although inclined portion 18 in the example shown forms part of the casing 10, it would be possible to dispose the said portion at the rear face of leg 15, thus abutting against the top 10a of casing 10, when the mirror is moved to its operative position.

As it is obvious from Figs. 2 and 3 of the drawing, upon release of locking means 21, 22, the mirror 16 may be manipulated to assume an inverted position (indicated in dot-dash lines) on top 10a.

Upon removal of mirror from opening 12, lipstick 11 may be slid by means of knob 11a to its operative position (dot-dash lines) and may be directly applied to the lips which are being reflected in the mirror at 25. Mirror 16 thus follows the movement of the lipstick 11 along lips 25, the device according to this invention permitting simultaneous manipulation of mirror and lipstick by only one hand of a person to effectuate either operative or inoperative positions of the device.

Any suitable provisions may be made in order to protect the mirror from breaking, when in closed or inoperative position (Fig. 3).

It is to be observed that instead of a single mirror adapted to assume a predetermined angular position with respect to the open end of the lipstick casing, two mirrors may be employed which may face one another in inoperative position and may be spring actuated and movable about a hinge similar to that shown at 19 in my U. S. Letters Patent No. 2,294,212, whereby both mirrors will assume in their respective operative positions different angular relations with respect to said open end, so that the lower lip of the user may be reflected in one of the mirrors (preferably the lower one) and the upper lip may be viewed in the other mirror.

In furtherance thereof reference is made to Figs. 4 and 5 of the drawing where the relationship between the mirrors 16a, 16b, respectively, the lips and the eye of the user is diagrammatically indicated.

Although there has been disclosed and described in particular and considerable detail one of many possible forms of the combination mirror and lipstick device herein described and embodying the invention, many modifications in size, proportions, shape, material, and arrangements of parts may be made to arrive at the spirit and result of this invention without departing from the principles of the invention set forth in the claims.

Having thus described the invention what I claim as new and desire to secure by Letters Patent, is:

1. An article of the character described comprising in combination, a casing having an open end and adapted to slidably contain a lipstick therein, a mirror, said casing having a portion sloping toward said open end, and hinge means connected to said mirror and disposed on said portion such that said mirror is arranged above said portion in operative position to reflect the image of said lipstick slid out of said open end, and in inoperative position in front of said open end to close said casing while said lipstick is retracted in said casing.

2. In combination with an elongated casing having an open end and adapted to contain a lipstick in said casing for projection beyond said open end, hinged mirrors adapted to face each other in inoperative position and to overlie said open end for closing the same, a supporting member on said casing and extending lengthwise thereof, a pivot on said casing and attached to one of the ends of said supporting member, the other end of said supporting member being connected to said hinged mirrors and being adapted to be swung together with said mirrors about said pivot above said casing into operative position, and means connected to said hinged mirrors to place the latter into angular position with respect to each other so as to reflect the image of said projected lipstick in said mirrors, respectively.

3. In combination, an elongated casing having an open end and adapted to contain a lipstick for projection beyond said open end, a mirror transversely disposed with respect to said casing, a pivot on top of said casing, a supporting member swingably connected to said pivot and having a forward end, said transverse mirror being fixedly attached to said forward end and arranged with respect to said pivot so that when said supporting member is swung about said pivot said mirror is facing the front of said open end and is positioned thereagainst to close the same or above said casing to reflect the image of the lipstick when projected from said open end, and locking means arranged for releasably engaging said casing with said mirror to secure the latter in its position in front of said open end.

4. In combination, an elongated housing having an open end and adapted to contain a lipstick for projection beyond said open end, hinged mirrors facing each other in one position and angularly disposed with respect to one another in another position, a pivot on top of said casing, a supporting member swingably connected to said pivot and having a forward end, said hinged mirrors being connected to said forward end and being swingable together with said supporting member about said pivot so that the mirrors in their facing position are disposed in front of said open end to close the same and in their angular position are arranged above said casing to reflect the image of the lipstick when projected from said open end.

HENRY SCHARFF.